(12) United States Patent
Kreiner (10) Patent No.: US 7,793,223 B2
(45) Date of Patent: Sep. 7, 2010

(54) METHODS, SYSTEMS, AND COMPUTER PROGRAM PRODUCTS FOR MANAGING USER FOCUS CHANGE BETWEEN APPLICATIONS

(75) Inventor: Barrett Kreiner, Woodstock, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1064 days.

(21) Appl. No.: 11/416,577

(22) Filed: May 3, 2006

(65) Prior Publication Data

US 2007/0261005 A1 Nov. 8, 2007

(51) Int. Cl.
*G06F 3/00* (2006.01)
*G06F 17/00* (2006.01)

(52) U.S. Cl. .......................... 715/767; 715/766; 715/802
(58) Field of Classification Search ................ 715/764, 715/765, 766, 767, 794, 796, 802, 803
See application file for complete search history.

(56) References Cited

U.S. PATENT DOCUMENTS

| 5,867,160 A * | 2/1999 | Kraft et al. .................. 715/803 |
| 2004/0117804 A1 * | 6/2004 | Scahill et al. ............... 719/320 |
| 2004/0255179 A1 * | 12/2004 | Mayer .......................... 714/1 |
| 2008/0177994 A1 * | 7/2008 | Mayer .......................... 713/2 |

\* cited by examiner

*Primary Examiner*—X. L Bautista
(74) *Attorney, Agent, or Firm*—Myers Bigel Sibley & Sajovec (57) ABSTRACT

Methods, systems and computer program products for managing user focus change between applications on a computer are provide. A current user focus application is identified that is executing on the computer and has a current user focus. A current state of execution of the current user focus application is determined. Information characterizing a focus criticality of the determined current state of execution of the current user focus application is obtained. A request from another application executing on the computer to change the current user focus to the other application is limited based on the focus criticality of the determined current state of execution of the current user focus application. The request from the other application to change the current user focus to the other application is allowed responsive to a user override authorization regardless of the focus criticality of the determined current state of execution of the current user focus application.

20 Claims, 3 Drawing Sheets

METHODS, SYSTEMS, AND COMPUTER PROGRAM PRODUCTS FOR MANAGING USER FOCUS CHANGE BETWEEN APPLICATIONS

BACKGROUND

The present invention generally relates to the field of computer systems and, more particularly, to multitasking environment computer systems.

Multitasking computer systems typically provide for a plurality user interfaces to be selectively presented to a user of the computer system. Such interfaces are typically graphical user interfaces (GUIs) presented on a display or displays of the computer system, which may be referred to as windows and/or dialog boxes. Windowing interfaces may be generated by an operating system of the computer system and may have to accommodate multiple, concurrently running applications that are acting to control the user's focus and the visual placement of their windows and dialogs, and the appearance of those windows and dialogs.

Such multiple application use of the user interface can be seen, for example, in browser applications allowing "pop up" and "pop under" advertising. A further example is found in some instant messaging applications and other event driven applications, that may demand the operating system bring the application to the front and claim the user focus for their window interface regardless of the user's current activity. Such pop up or under windows or applications may create problems and potential security risks. For example, if a user is entering data into a form for login to one application, a focus change could collect information in another application before the user noticed the change. Even if the information is not critical or compromised, the focus change may interrupt the flow of work and attention of the user by shifting the focus from one application to another, which may decrease user productivity.

Further security risks are presented by, for example, applications placing a window behind another window that receives the user typed inputs where such a hidden window provides type back. In other words, the hidden window may be configured to capture the keystrokes and pass them back to the original, still visible window, so that the user may not even know that a focus change has occurred.

It is known to associate a "modality" with a window or dialog box. One such modality is "exclusive." By designating a window or dialog box as exclusive, a user may be required to complete an entry before the user or any other application can change the focus. An example of an exclusive modality window is the log-in pop up window for the Windows™ operating system. However, such exclusive modality windows may freeze up the user's access to the computer system. In addition, pop up blockers have been developed for some browser applications, where all pop ups are blocked while the browser application is executing.

SUMMARY

Embodiments of the present invention include methods of managing user focus change between applications on a computer. A current user focus application is identified that is executing on the computer and has a current user focus. A current state of execution of the current user focus application is determined. Information characterizing a focus criticality of the determined current state execution of the current user focus application is obtained. A request from another application executing on the computer to change the current user focus to the other application is limited based on the focus criticality of the determined current state of execution of the current user focus application. The request from the other application to change the current user focus to the other application is allowed responsive to a user override authorization regardless of the focus criticality of the determined current state of execution of the current user focus application. The request may be received from the other application and a user may be prompted for the user override authorization responsive to receiving the request from the other application.

In other embodiments, obtaining information characterizing a focus criticality includes obtaining metadata associated with the current user focus application. The metadata may be integrated with the current user focus application and/or provided as data accompanying the current user focus application. Obtaining the information characterizing focus criticality may include obtaining stored prefetch data for the current user focus application that specifies focus criticality for a plurality of states of execution of the current user focus application.

In further embodiments, obtaining information characterizing a focus criticality is preceded by monitoring user interaction with the current focus application over time and identifying focus criticality for a plurality of states of execution of the current user focus application based on the monitored user interaction. The identified focus criticality for the plurality of states of execution is formatted as metadata associated with the current user focus application. A user designation of focus criticality for a plurality of states of execution of the current focus application may be received and the re received user designation of focus criticality may be formatted as the metadata associated with the current user focus application. User designations of focus criticality for a plurality of states of execution for a plurality of applications installed on the computer may be received and the received user designations of focus criticality may be formatted as metadata associated with the respective plurality of applications installed on the computer.

In other embodiments, determining a current state of execution of the current user focus application includes identifying a field type of an active field and/or an active container of a currently displayed user interface of the current user focus application. Limiting a request may include placing the limited request in a request pending queue.

In further embodiments, the method further includes detecting a change in the current state of execution of the current user focus application to an updated state of execution and obtaining information characterizing a focus criticality of the updated state of execution. When it is determined that the focus criticality of the updated state of execution allows other applications to change the current user focus, the current user focus is changed to another application based on the limited request in the request pending queue. Detecting a change in the current state of execution may include detecting a user and/or application initiated change of current user focus to a different active field and/or a different active container and/or a different displayed user interface of the current user focus application.

In yet other embodiments, a user initiated change in the current user focus to a new current user focus application executing on the computer is detected. A current state of execution of the new current user focus application is determined and information characterizing a focus criticality of the determined current state of execution of the new current focus application is obtained. When it is determined that the focus criticality of the determined current state of execution of the new current focus application allows other applications to change the current user focus, the current user focus is changed to another application based on the limited request in the request pending queue.

In further embodiments, obtaining information characterizing a focus criticality is preceded by obtaining focus criticality for a plurality of states of execution of the current user focus application from a community database containing focus criticality information based on monitoring user interaction with the current focus application by a plurality of users over time. The obtained focus criticality for the plurality of states of execution is formatted as metadata associated with the current user focus application to provide the information characterizing a focus criticality. Obtaining information characterizing a focus criticality may include obtaining stored prefetch data for the current user focus application that specifies focus criticality for a plurality of states of execution of the current user focus application.

In yet other embodiments, computer systems include a plurality of executable applications residing on the computer system and having associated information characterizing focus criticality for different states of execution of the applications. A user interface of the computer system is configured to receive a user override authorization. A focus control module of the computer system is configured to control execution of the applications, including limiting requests from the applications to change a current user focus from a current user focus one of the applications to another one of the applications based on a portion of the information characterizing focus criticality associated with the current user focus one of the applications and a determined state of execution of the current user focus one of the applications. The focus control module is further configured to allow the requests from the applications to change the current user focus responsive to the user override authorization received from the user interface.

In further embodiments, the computer system includes a request pending queue configured to maintain requests for a change of current user focus limited by the focus control module. The focus control module is further configured to detect a change in the current state of execution of the current user focus one of the applications to an updated state of execution, to obtain information characterizing a focus criticality of the updated state of execution, to determine when the focus criticality of the updated state of execution allows other ones of the applications to change the current user focus and to change the current user focus to the other ones of the applications based on requests in the request pending queue responsive to determining that the focus criticality of the updated state of execution allows other ones of the applications to change the current user focus. The focus control module may be configured to retrieve prefetch data, including focus criticality information for a requested one of the applications, on startup of the requested one of the applications.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION OF EMBODIMENTS OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or flowchart illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
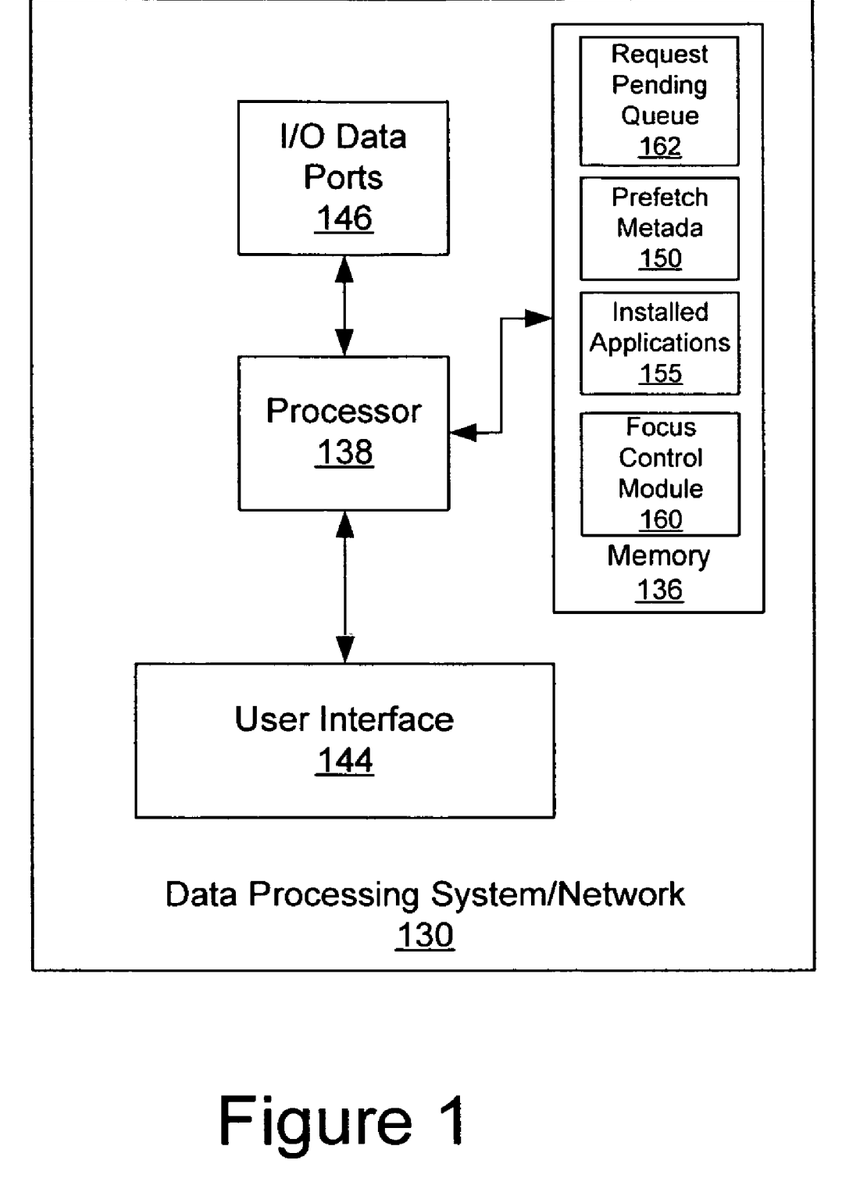
FIG. 1 is a block diagram of a data processing system suitable for use in some embodiments of the present invention.

Referring now to FIG. 1, an exemplary embodiment of devices, for example, a personal computer system or the like or other data processing system 130 configured in accordance with some embodiments of the present invention will be discussed. The data processing system 130, which may be incorporated in, for example, a personal computer, a PDA, a wireless terminal/phone, or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network that may be associated with a communications service provider or user communication devices using, for example, an Internet Protocol (IP) connection. These components may be conventional components such as those used in many conventional data processing systems, which may be configured to operate as described herein.

As shown in the embodiments of FIG. 1, the memory 136 includes a request pending queue 162, prefetch metadata 150, installed applications 155 and a focus control module 160. While shown as resident in the memory 136 in the embodiments of FIG. 1 it will be understood that the respective database and module features, including the installed applications 155 and the focus control module 160, may be implemented, for example, as part of the operating system, as application programs, as components of a dynamic link library or the like of the data processing system 130 so as to be executed in whole or in part by the processor 138.

In some embodiments of the present invention, the installed plurality of executable applications 155 reside on the data processing system 130 and have associated information characterizing focus criticality for different states of execution of the respective applications. The focus criticality information may be maintained, for example, as metadata associated with each of the respective applications. The metadata may be provided integrated with the applications and/or as data accompanying the applications. For example, in some embodiments of the present invention, focus criticality information may be obtained from stored prefetch metadata 150 that is associated with respective applications and which specifies focus criticality for a plurality of states of execution of the associated application.

The prefetch metadata 150 may also include additional information, such as prefetch data known conventionally to be collected for an application and accessed on startup every time the application is run so that information regularly needed and accessed can be preloaded to speed execution time. The prefetch metadata 150 may also include conventional data associated with the application that may be used in disk defragmentation or the like to increase access response time on startup of the respective applications.

The focus control module 160 may be configured to control execution of the installed applications 155, including limiting requests from the applications 155 to change a current user focus from one of the applications 155 to another of the applications 155. The focus control module 160 may be configured to limit such requests based on some or all of the information characterizing focus criticality associated with a current user focus one of the applications 155 and a determined state of execution of the current user focus one of the applications 155. The focus control module 160 may further be configured to allow requests from the applications 155 to change the current user focus responsive to a user override authorization. The user interface 144 and/or the I/O data ports 146 may be configured to receive the user override authorization from a user and provide the authorization to the focus control module 160.

Also shown in the memory 136 for the illustrated embodiments of the present invention in FIG. 1 is the request pending queue 162. The request pending queue 162 is configured to maintain requests for a change of current user focus that have been limited by the focus control module 160. The focus control module 160 may be configured to detect a change in the current state of execution of a current focus one of the applications 155 to an updated state of execution and obtain information characterizing a focus criticality of the updated state of execution. The focus control module 160 may further be configured to determine when the focus criticality of the updated state of execution allows other ones of the applications 155 to change the current user focus and further to change the current user focus to the other requesting one of the applications 155 based on requests in the request pending queue 162. The change in focus may be provided automatically without further user or application intervention responsive to determining that the focus criticality of the updated state of execution allows other ones of the applications 155 to change the current user focus in some embodiments of the present invention.

While the focus control module 160 is shown as an application stored in the memory 136 as illustrated in FIG. 1, other arrangements of the operations of the focus control module 160 fall within the scope of the present invention. For example the focus control module 160 may include a plurality of applications stored in the memory 136 and executed by the processor 138 and/or may be incorporated as part of an operating system of the data processing system 130 in some embodiments. Accordingly, the particular grouping of operations illustrated in FIG. 1 is solely for the purposes of explanation of the present invention.

Some embodiments of the present invention, such as illustrated in FIG. 1, may provide systems 130 executing operating systems configured to recognize the criticality of not just a user display window but the application flow of an application associated with such a window or windows. As such, systems 130, according to some embodiments of the present invention, may limit or even prevent other applications from inadvertently or overtly interrupting the current (focused) application flow and disturbing that application flow. However, unlike exclusive modality, if a user chooses to step away from an application flow explicitly, such as by selection of another window or other focus change, the system can cue up interruptions and release them at the time or otherwise.

Figures 2, 3:
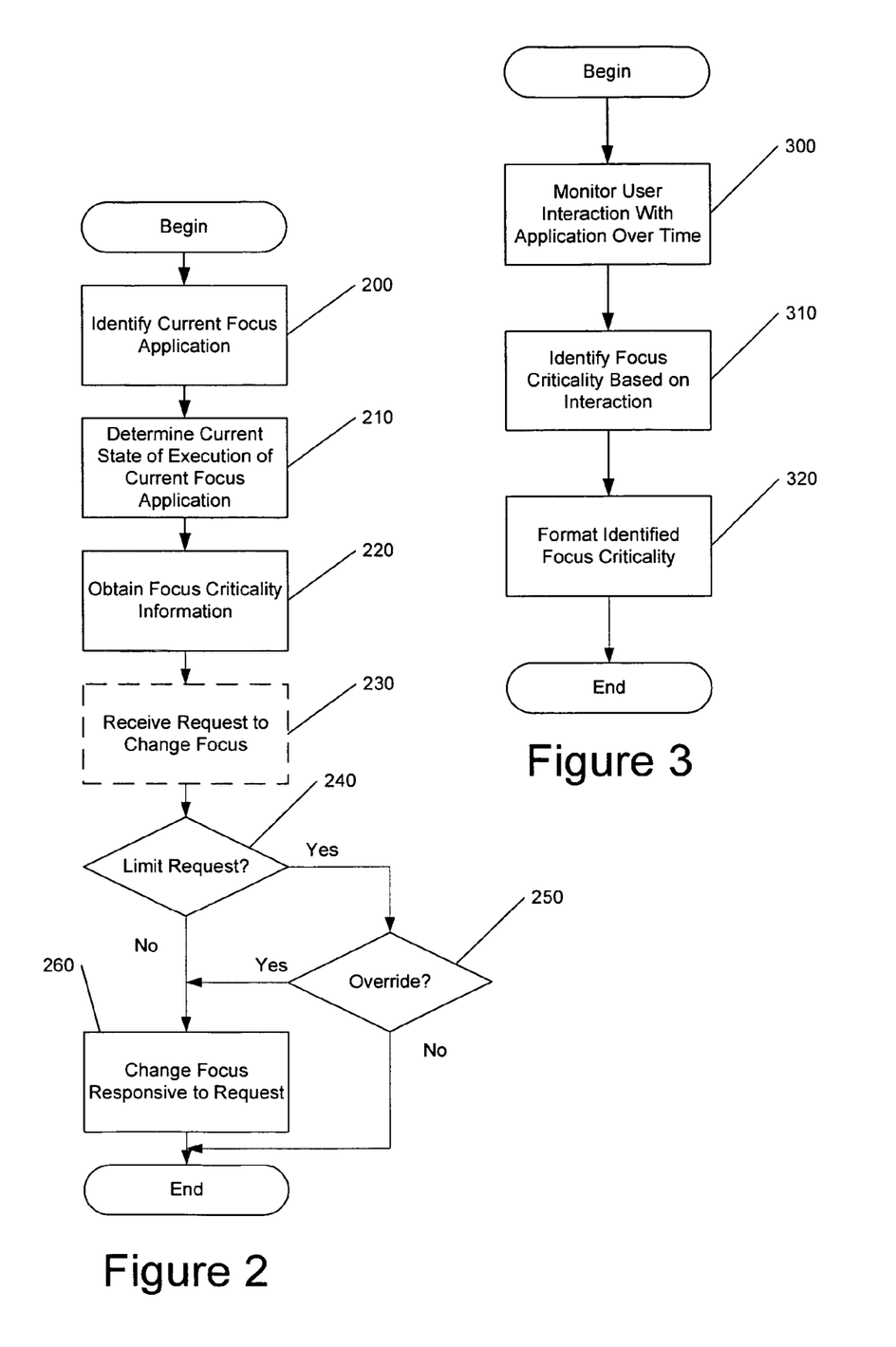
FIGS. 2-5 are flowcharts illustrating operations for managing user focus change between applications according to some embodiments of the present invention.

Computer implemented methods of managing user focus change between applications on a computer and will now be described with reference to the flowchart illustrations of FIGS. 2-5. Referring first to FIG. 2, operations for the illustrated embodiments begin by identifying a current user focus application executing on the computer system (Block 200). A current state of execution of the current user focus application is determined (Block 210). In some embodiments, determining a current state of execution at Block 210 includes identifying a field type of an active field and/or an active container of a currently displayed user interface of the current user focus application. For example in the Windows™ operating system available from Microsoft Corporation, the operating system generally identifies and tracks all established windows.

The operating system further, typically, knows information about some or all of the fields in the respective windows. For example, the operating system may be aware of fields by a type designation, such as a password field, and may use this information in conventional systems, for example, to display an asterisk when a user types characters into a password type field. The operating system may also, in some embodiments of the present invention, be modified to develop the ability to infer functionality from a name or other character information associated with a field in a window. It will be understood that, as used herein, a window may be referred to in some instances as a container that may include fields. In some instances, a window or container may have additional information, such as an extensible mark up language (XML) object or dialogue relationship may be defined, and when an associated container is active, interrupts may be deferred while an identified relationship is categorized as critical.

Information characterizing a focus criticality of the determined current state of execution of the current user focus application is obtained (Block 220). For example, metadata integrated with the application and/or provided as data accompanying the current focus application, such as prefetch metadata 150, may be obtained at Block 220.

As illustrated in FIG. 2, in some embodiments of the present invention a request to change the current user focus may be received from another application (Block 230). Operations as will be described for Blocks 240-260 may be executed responsive to receiving a request at Block 230.

Operations at Block 240 include determining whether the request for a change in focus should be limited based on the focus criticality of the determined state of execution of a current user focus application. If it is determined that the request is not to be limited (Block 240), the current user focus is changed responsive to the received request (Block 260). When the determined current state of execution has an associated focus criticality indicating that the request to change focus should be limited (Block 240), it is determined whether a user override authorization has been received for the request (Block 250).

If a user override authorization has been received (Block 250), regardless of the focus criticality of the determined current state of execution of the current user focus application, the request is allowed and the focus is changed in response to the request (Block 260). If no user override authorization has been received (Block 250), operations at Block 260 are bypassed and the current user focus in not changed.

Operations related to obtaining information characterizing a focus criticality for some embodiments of the present invention will now be further described with reference to FIG. 3. For the illustrated embodiments of FIG. 3, user interaction with one or more of the applications 155 is monitored over time (Block 300) and a focus criticality for the one or more applications is identified for a plurality of states of execution of the application(s) based on the monitored user interaction (Block 310). Thus, in some embodiments of the present invention as shown in FIG. 3, the focus criticality data is obtained by the computer system itself implicitly using monitoring of the previous user interaction with ones of the applications 155.

In other embodiments of the present invention, operations at Block 300 and Block 310 may include or be replaced by receiving a user designation of focus criticality for a plurality of states of execution of one or more of the applications 155 explicitly from a user and/or designer of the application, such as designation of flow states during execution of an application where a focus change should not occur. In other embodiments of the present invention, some or all of the focus criticality information may be obtained by parsing field attribute names or the like associated with user input screens utilized by respective applications.

In yet further embodiments, focus criticality information may be organized into communities similar to SPAM or spyware communities, that use large numbers of people associated with particular applications. As such, focus criticality information for states of execution of ones of the applications 155 may be obtained from a community database or the like containing focus criticality information based on monitoring user interaction with the respective applications by a plurality of users over time.

The identified focus criticality for the plurality of states of execution are formatted as a metadata associated with the respective application or applications 155 (Block 320). For example, the information may be formatted as metadata integrated with the respective applications and/or provided as data accompanying the applications, such as in the prefetch metadata 150.

Figures 4, 5:
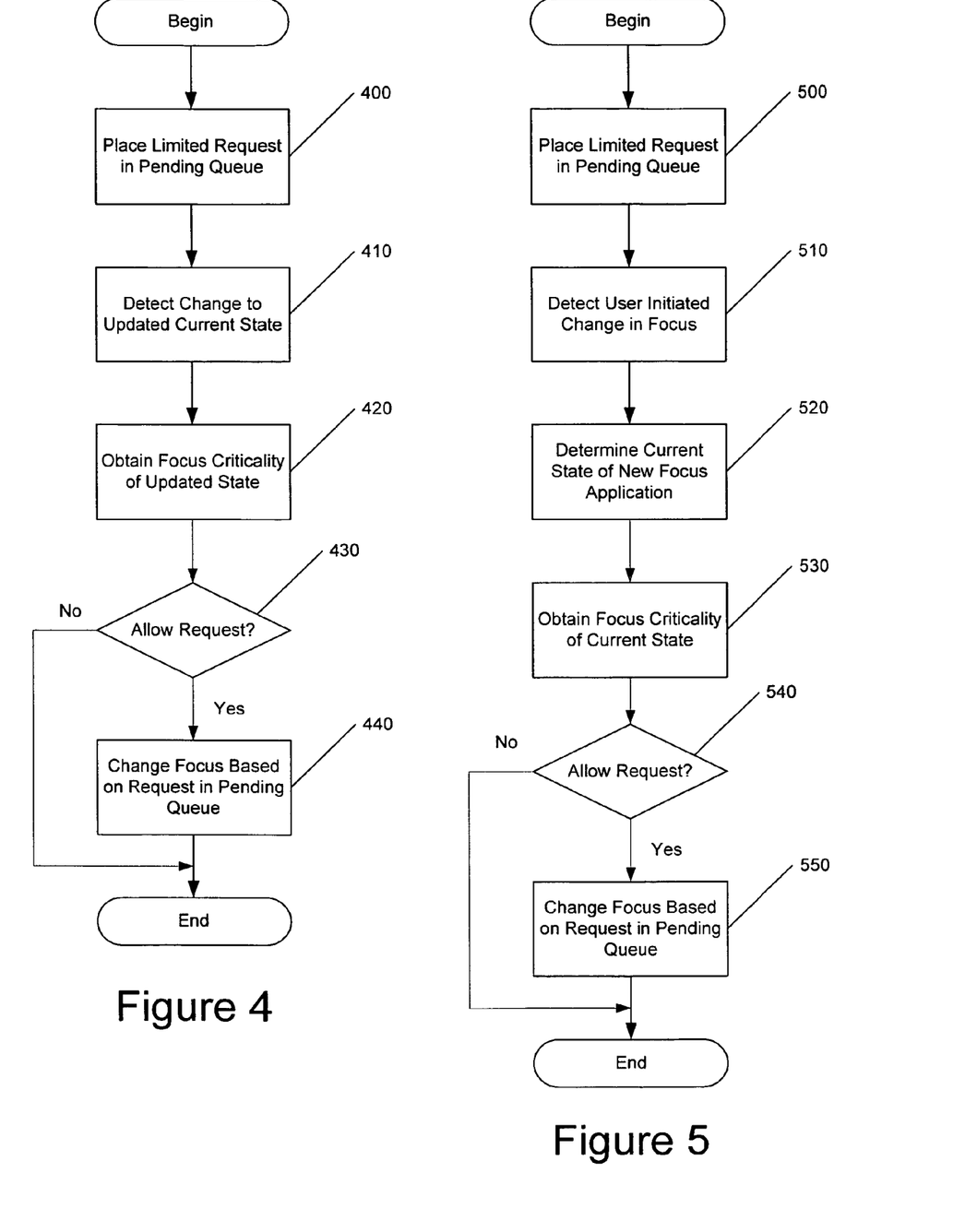

Operations related to limiting request for a change in a current user focus according to some embodiments of the present invention will now be further described with reference to the flow chart illustration of FIG. 4. Operations as illustrated in FIG. 4 begin after a request for a change in user focus has been limited by placing the limited request in the request pending queue 162 (Block 400). A change in the current state of execution of the current user focus application to an updated state of execution is detected (Block 410). For example, operations at Block 210 of FIG. 2 may include detecting an active field or an active container of a currently displayed user interface of the current user focus application. Detecting a change in the current state of execution at Block 410 may then include detecting a user and/or application initiated change of current user focus to a different active field and/or a different active container and/or a different displayed user interface of the current user focus application.

Information characterizing a focus criticality of the updated state of execution is obtained (Block 420). It is determined whether the focus criticality of the updated state of execution allows other applications to change the current user focus (Block 430). If it is determined that the focus criticality of the updated state of execution allows other executions to change the current user focus (Block 430), the current user focus is changed to another application associated with or defined by the limited request in the request pending queue 162 (Block 440).

Operations related to limiting requests for a change in user focus according to some embodiments of the present invention will now be further described with reference to the flowchart illustration of FIG. 5. As with FIG. 4, operations begin in the illustrated embodiments of FIG. 5 after a request to change user focus has been limited by placing the limited request in the request pending queue 162 (Block 500). A user initiated change in the current user focus to a new current user focus application executing on the data processing system 130 is detected (Block 510). In other words, FIG. 5 operations at Block 510 differ from Block 410 of FIG. 4 in that the change is a user initiated change to a distinct application, rather than a change in the current state of the current focus application.

A current state of execution of the new current user focus application is determined (Block 520). Information characterizing a focus criticality of the determined state of execution of the new current user focus application is obtained (Block 530).

It is determined whether the focus criticality of the determined current state of execution of the new current user focus application allows for applications to change the current user focus (Block 540). If the focus criticality of the determined state of execution of the new current user focus application does allow other applications to change the current user focus (Block 540), the current user focus is changed to another application based on a limited request in the request pending queue 162 (Block 550). Otherwise, operations at Block 550 are bypassed and the change associated with the limited request in the request pending queue 162 is not initiated.

As described herein, for some embodiments of the present invention, the flow of the application, including the parts of the flow when a change is user focus would be a security risk and/or lower productivity or the like, is provided to the operating system in the form of metadata and may be either integrated into the application or provided as accompanying data. In various embodiments of the present invention, this metadata can be collected explicitly, for example, with the designer specifying where the change in focus should not occur, or implicitly by the operating system, either through previous user interaction or parsing of the field attribute names of the various user attribute screens. Furthermore, the behavior of applications could be organized into communities, similar to SPAM or spyware communities that use large numbers of people to identify and track the behavior. In addition, user preference input can be supported allowing a user to setup the operating system for their use in a manner that specifies behavior of different executing installed applications that may otherwise change user focus.

Such a user input may be obtained by the operating system as an option at the time of installation of the application. For example, when a user installs an instant messaging application, the operating system could present the user the option of limiting the right of the installed instant messaging application to change a current user focus by requiring that express authorization be obtained first from the user. As such, in various embodiments of the present invention, greater security and user productivity may be provided, while still providing flexibility to individual users to configure their systems in a manner most to their liking.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method of managing user focus change between applications on a computer, comprising:
   identifying a current user focus application executing on the computer having a current user focus;
   determining a current state of execution of the current user focus application, wherein the current state of execution is one of a plurality of states of execution of the current focus application;
   obtaining information characterizing a focus criticality of the determined current state of execution of the current user focus application;
   limiting a request from another application executing on the computer to change the current user focus to the another application based on the focus criticality of the determined current state of execution of the current user focus application; and
   allowing the request from the another application to change the current user focus to the another application responsive to a user override authorization regardless of the focus criticality of the determined current state of execution of the current user focus application.

2. The method of claim 1, wherein obtaining information characterizing a focus criticality comprises obtaining metadata associated with the current user focus application.

3. The method of claim 2, wherein obtaining information characterizing a focus criticality is preceded by:
   monitoring user interaction with the current focus application over time;
   identifying focus criticality for a plurality of states of execution of the current user focus application based on the monitored user interaction;
   formatting the identified focus criticality for the plurality of states of execution as the metadata associated with the current user focus application.

4. The method of claim 2, wherein obtaining information characterizing a focus criticality is preceded by:
   receiving a user designation of focus criticality for a plurality of states of execution of the current focus application; and
   formatting the received user designation of focus criticality as the metadata associated with the current user focus application.

5. The method of claim 4, wherein receiving a user designation comprises receiving user designations of focus criticality for a plurality of states of execution for a plurality of applications installed on the computer and wherein formatting the received user designations comprises formatting the received user designations of focus criticality as metadata associated with the respective plurality of applications installed on the computer.

6. The method of claim 1, wherein determining a current state of execution of the current user focus application includes identifying a field type of an active field and/or an active container of a currently displayed user interface of the current user focus application.

7. The method of claim 1, wherein limiting a request includes placing the limited request in a request pending queue, and wherein the method further comprises:
   detecting a change in the current state of execution of the current user focus application to an updated state of execution;
   obtaining information characterizing a focus criticality of the updated state of execution;
   determining that the focus criticality of the updated state of execution allows other applications to change the current user focus; and
   changing the current user focus to the another application based on the limited request in the request pending queue responsive to determining that the focus criticality of the updated state of execution allows other applications to change the current user focus.

8. The method of claim 7, wherein determining a current state of execution of the current user focus application includes detecting an active field or an active container of a currently displayed user interface of the current user focus application and wherein detecting a change in the current state of execution comprises detecting a user and/or application initiated change of current user focus to a different active field and/or a different active container and/or a different displayed user interface of the current user focus application.

9. The method of claim 1, wherein limiting a request includes placing the limited request in a request pending queue, and wherein the method further comprises:
detecting a user initiated change in the current user focus to a new current user focus application executing on the computer;
determining a current state of execution of the new current user focus application;
obtaining information characterizing a focus criticality of the determined current state of execution of the new current focus application;
determining that the focus criticality of the determined current state of execution of the new current focus application allows other applications to change the current user focus; and
changing the current user focus to the another application based on the limited request in the request pending queue responsive to determining that the focus criticality of the determined current state of execution of the new current focus application allows other applications to change the current user focus.

10. The method of claim 1, wherein the method further comprises receiving the request from the another application and wherein allowing the request from the another application includes prompting a user for the user override authorization responsive to receiving the request from the another application.

11. The method of claim 1, wherein obtaining information characterizing a focus criticality comprises obtaining metadata integrated with the current user focus application and/or provided as data accompanying the current user focus application.

12. The method of claim 1, wherein obtaining information characterizing a focus criticality is preceded by:
obtaining focus criticality for a plurality of states of execution of the current user focus application from a community database containing focus criticality information based on monitoring user interaction with the current focus application by a plurality of users over time; and
formatting the obtained focus criticality for the plurality of states of execution as metadata associated with the current user focus application to provide the information characterizing a focus criticality.

13. The method of claim 1, wherein obtaining information characterizing a focus criticality comprises obtaining stored prefetch data for the current user focus application that specifies focus criticality for a plurality of states of execution of the current user focus application.

14. A computer system configured to carry out the method of claim 1.

15. A computer program product for managing user focus change between applications executing on a program, the computer program product comprising computer program code embodied in a computer readable medium, the computer program code comprising program code configured to carry out the method of claim 1.

16. A computer system comprising:
a plurality of executable applications residing on the computer system and having associated information characterizing focus criticality for different states of execution of the applications;
a user interface configured to receive a user override authorization; and
a focus control module configured to control execution of the applications including limiting requests from the applications to change a current user focus from a current user focus one of the applications to another one of the applications based on a portion of the information characterizing focus criticality associated with the current user focus one of the applications and a determined state of execution of the current user focus one of the applications, wherein the determined state of execution is one of a plurality of states of execution of the current user focus one of the applications, and wherein the focus control module is further configured to allow the requests from the applications to change the current user focus responsive to the user override authorization received from the user interface.

17. The computer system of claim 16, further comprising a request pending queue configured to maintain requests for a change of current user focus limited by the focus control module and wherein the focus control module is further configured to detect a change in the current state of execution of the current user focus one of the applications to an updated state of execution, to obtain information characterizing a focus criticality of the updated state of execution, to determine when the focus criticality of the updated state of execution allows other ones of the applications to change the current user focus and to change the current user focus to the other ones of the applications based on requests in the request pending queue responsive to determining that the focus criticality of the updated state of execution allows other ones of the applications to change the current user focus.

18. The computer system of claim 16, wherein the associated information characterizing focus criticality comprises metadata associated with corresponding ones of the applications.

19. The computer system of claim 18, wherein the metadata comprises prefetch data associated with corresponding ones of the applications that specifies focus criticality for a plurality of states of execution associated with the corresponding ones of the applications and wherein the focus control module is configured to retrieve the prefetch data for a requested one of the applications on startup of the requested one of the applications.

20. A computer program product for managing user focus change between applications executing on a computer, comprising:
a computer readable medium having computer readable program code embodied therein, the computer readable program code comprising:
computer readable program code configured to identify a current user focus application executing on the computer having a current user focus;
computer readable program code configured to determine a current state of execution of the current user focus application, wherein the current state of execution is one of a plurality of states of execution of the current user focus application;

computer readable program code configured to obtain information characterizing a focus criticality of the determined current state of execution of the current user focus application;

computer readable program code configured to limit a request from another application executing on the computer to change the current user focus to the another application based on the focus criticality of the determined current state of execution of the current user focus application; and computer readable program code configured to allow the request from the another application to change the current user focus to the another application responsive to a user override authorization regardless of the focus criticality of the determined current state of execution of the current user focus application.

* * * * *